(12) United States Patent
Grinwald et al.

(10) Patent No.: US 9,785,078 B2
(45) Date of Patent: Oct. 10, 2017

(54) ELECTROSTATIC INK COMPOSITIONS

(71) Applicant: Hewlett-Packard Indigo B.V., Amstelveen (NL)

(72) Inventors: Yaron Grinwald, Nes Ziona (IL); Yana Reznick, Nes Ziona (IL); Reut Avigdor, Nes Ziona (IL); Gregory Katz, Nes Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 15/025,671

(22) PCT Filed: Oct. 21, 2013

(86) PCT No.: PCT/EP2013/071983
§ 371 (c)(1),
(2) Date: Mar. 29, 2016

(87) PCT Pub. No.: WO2015/058785
PCT Pub. Date: Apr. 30, 2015

(65) Prior Publication Data
US 2016/0216629 A1    Jul. 28, 2016

(51) Int. Cl.
*G03G 9/12* (2006.01)
*C09D 11/037* (2014.01)
*C09D 11/10* (2014.01)
*C09D 11/52* (2014.01)
*G03G 9/13* (2006.01)

(52) U.S. Cl.
CPC .......... *G03G 9/122* (2013.01); *C09D 11/037* (2013.01); *C09D 11/10* (2013.01); *C09D 11/52* (2013.01); *G03G 9/13* (2013.01); *G03G 9/131* (2013.01)

(58) Field of Classification Search
CPC ..................................................... G03G 9/122
See application file for complete search history.

(56) References Cited

U.S. PATENT DOCUMENTS

| 3,405,683 A | 10/1968 | Jons et al. |
| 3,900,003 A | 8/1975 | Sato et al. |
| 4,073,266 A | 2/1978 | Arneth et al. |

(Continued)

FOREIGN PATENT DOCUMENTS

| EP | 1562410 | 8/2005 |
| EP | 1887056 | 2/2008 |

(Continued)

OTHER PUBLICATIONS

International Search Report and Written Opinion dated May 23, 2014 for PCT/EP2013/071983 filed Oct. 21, 2013, Applicant Hewlett-Packard Indigo B.V.

(Continued)

*Primary Examiner* — Hoa V Le
(74) *Attorney, Agent, or Firm* — Thorpe, North & Western L.L.P.

(57) ABSTRACT

This disclosure relates to an electrostatic ink composition comprising:
a liquid carrier, and
particles dispersed in the liquid carrier, wherein the particles comprise a resin and a substantially spherical silver pigment; wherein the substantially spherical silver pigment constitutes at least 30 wt % of the solids of the electrostatic ink composition. Print substrates are also disclosed herein.

17 Claims, 2 Drawing Sheets

(56) References Cited

U.S. PATENT DOCUMENTS

| | | | |
|---|---|---|---|
| 4,342,823 A | 8/1982 | Grant et al. | |
| 4,400,079 A | 8/1983 | Landa | |
| 4,504,138 A | 3/1985 | Kuehnle et al. | |
| 4,690,539 A | 9/1987 | Radulski et al. | |
| 4,860,924 A * | 8/1989 | Simms | G03G 15/104 118/689 |
| 5,749,083 A | 5/1998 | Koda et al. | |
| 6,623,902 B1 | 9/2003 | Ben-Avraham et al. | |
| 7,670,742 B2 | 3/2010 | Tsubuko et al. | |
| 7,736,693 B2 | 6/2010 | Garbar et al. | |
| 7,955,528 B2 | 6/2011 | Chung et al. | |
| 8,383,014 B2 | 2/2013 | Vanheusden et al. | |
| 8,709,600 B2 * | 4/2014 | Chun | C08K 5/0041 106/31.65 |
| 2007/0144305 A1 | 6/2007 | Jablonski et al. | |
| 2009/0162771 A1 | 6/2009 | Nakamura et al. | |
| 2011/0192633 A1 | 8/2011 | Allemand | |
| 2011/0244117 A1 | 10/2011 | Saban et al. | |
| 2012/0043512 A1 | 2/2012 | Liu et al. | |
| 2012/0232206 A1 | 9/2012 | Wu et al. | |
| 2014/0035995 A1 * | 2/2014 | Chou | C09D 11/101 347/20 |

FOREIGN PATENT DOCUMENTS

| | | |
|---|---|---|
| WO | 2007130069 | 11/2007 |
| WO | 2012078820 | 6/2012 |
| WO | 2012105951 | 8/2012 |
| WO | 2013103346 | 7/2013 |

OTHER PUBLICATIONS

Perelaer et al., Ink-jet Printing and Microwave Sintering of Conductive Silver Tracks, Advanced Materials 2006, 18, pp. 2101-2104.

Allen et al., Substrate-facilitated nanoparticle sintering and component interconnection procedure, IOPscience, Nanotechnology 21 475204, 2010, pp. 1-6.

* cited by examiner (a)

(b)

ELECTROSTATIC INK COMPOSITIONS

BACKGROUND

Electrostatic printing processes, sometimes termed electrophotographic printing processes, typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition including charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, which is often heated to fuse the solid image and evaporate the liquid carrier, and then to the print substrate.

DETAILED DESCRIPTION

Figure 1:
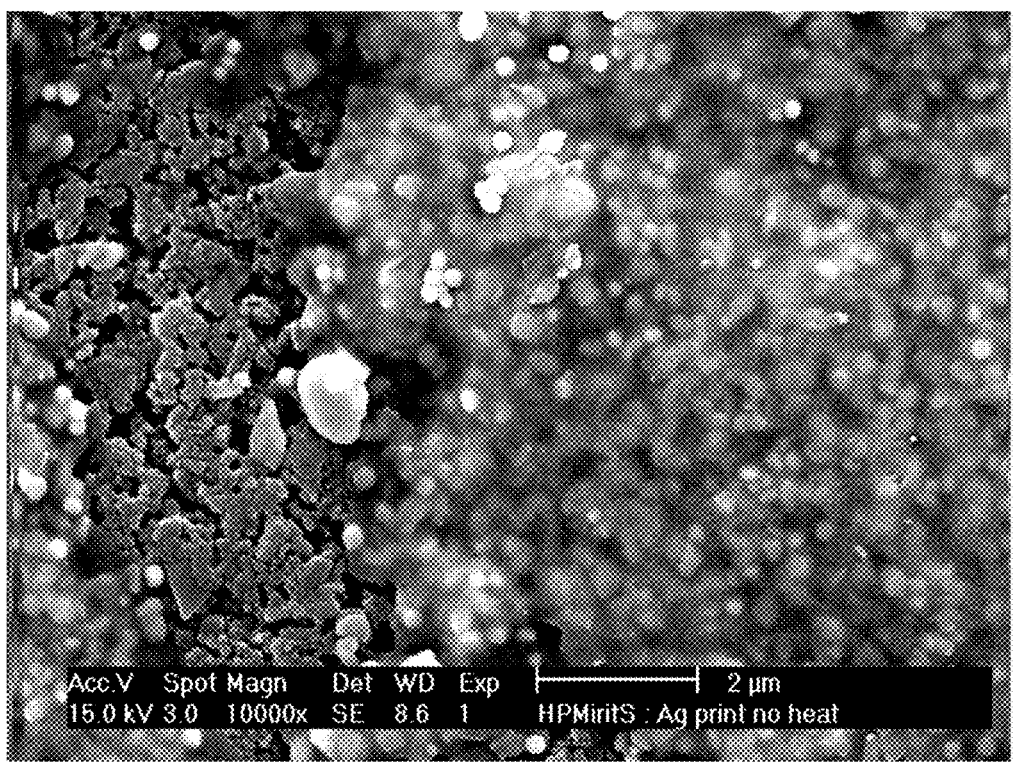
FIGS. 1(a) and 1(b) show, respectively SEM photos of an example of the ink described herein when printed on a substrate (a) before post treatment (heat and rubbing) (b) and after the post treatment.
Figure 1:
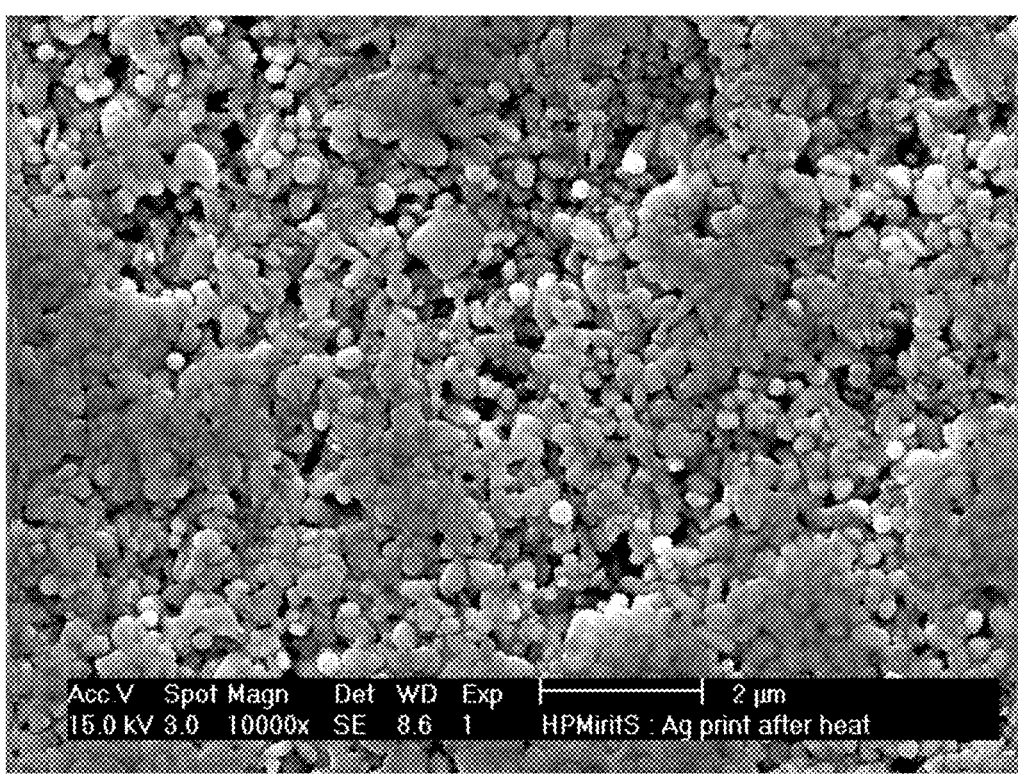

Before the methods, compositions, print substrates and related aspects of the disclosure are disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, conductive pigment such as the silver pigment mentioned herein, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to a ink composition, which may be in liquid form, that is typically suitable for use in an electrostatic printing process, sometimes termed an electrophotographic printing process. The electrostatic ink composition may comprise chargeable particles of the resin and the silver pigment, which may be as described herein, dispersed in a liquid carrier, which may be as described herein.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In an aspect, there is provided an electrostatic ink composition comprising
 a liquid carrier, and
 particles dispersed in the liquid carrier, wherein the particles comprise a resin and a silver pigment. In some examples, the silver pigment constitutes 30 wt % or more of the solids of the electrostatic ink composition, and/or the silver pigment may be a substantially spherical silver pigment. The electrostatic ink composition may be used in the method described herein.

In a further aspect, there is provided a print substrate having printed thereon an electrostatic ink comprising a resin having acidic side groups and a silver pigment. The silver pigment may constitutes 30 wt % or more of the solids of the electrostatic ink composition and/or the silver pigment may be a substantially spherical silver pigment. The print substrate may have been printed using a method described herein and/or using the electrostatic ink composition described herein.

It is desirable in some circumstances to print electrically conductive traces on substrates. This can be achieved using certain printing techniques, such as ink jet printing or screen printing. However, such printing techniques generally involve a post printing treatment to increase the conductivity of the printed traces to a desired level. In some instances, the post-treatment to achieve high conductivity involves heating the printed substrate to high temperatures; this is known as sintering. Sintering of some metals, particularly Ag, generally involves heating a printed substrate to a high temperature of 300-500° C. for an extended period. This allows conductive traces to be printed on certain materials, such as glass, silicon, and ceramics. However, such sintering is unsuitable for most flexible substrates such paper and plastic, since the substrate would deteriorate at the high temperature.

The present disclosure relates to electrostatic ink compositions that allow a conductive trace to be printed, with less aggressive post-printing treatment conditions, and, in some examples, no post-printing treatment. The ink printed on the print substrate, in some examples, will contain a silver pigment in an amount above the percolation threshold, to allow significant electrical conductivity through the ink. However, in some examples, during the printing process, the electrostatic ink composition will contain sufficient liquid carrier, such that the amount of the silver pigment is below the percolation threshold.

The silver pigment, in the present application, is an electrically conductive pigment. "Silver pigment" is a pigment that contains, consists essentially of or consists of silver. The silver may be in elemental or alloy form. "Consists essentially of" may indicate that the pigment contains at least 90 wt % silver, in some examples at least 95 wt % silver, in some examples, at least 98 wt % silver, in some examples at least 99 wt % silver. In some examples, the silver pigment may be comprise an alloy of silver and at least one other metal, which may be selected from copper, platinum and gold.

The silver pigment, in any of the aspects herein, may be substantially spherical. Substantially spherical may indicate that a particle has a maximum aspect ratio of two dimensions perpendicular to one another of 2 or less, in some examples 1.5 or less, in some examples 1.3 or less, in some examples 1.2 or less. The dimensions of a silver particle may be measured using standard techniques, including, but not limited to scanning electron micrography.

In some examples, the silver pigment comprises silver particles having a coating thereon of the resin. The resin may completely or partially coat the silver particles.

In some examples, at least some of the silver particles have a diameter of at least 5 nm, in some examples at least 10 nm, in some examples at least 20 nm, in some examples at least 30 nm, in some examples at least 50 nm, in some examples at least 100 nm, in some examples at least 120 nm, in some examples at least 150 nm, in some examples at least 180 nm, in some examples at least 200 nm, in some examples at least 220 nm, in some examples at least 240 nm, in some examples, at least 260 nm, in some examples at least 280 nm, in some examples at least 290 nm. In some examples, at least some of the silver pigment have a diameter of at least 500 nm, in some examples at least 700 nm, in some examples at least 800 nm, in some examples at least 1 µm, in some examples at least 10 µm, in some examples at least 50 µm, in some examples at least 100 µm.

It has found that using silver particles with higher diameters generally increases the conductivity of printed traces. The diameter of a particle may be the largest dimension measured across the particle. The diameter can be determined, for example, using techniques such as using a scanning electromicrography. The silver pigments may be approximately spherical. Silver pigment and silver particle may be used interchangeably herein.

In some examples, at least some of the silver particles have a diameter of 100 µm or less, in some examples 50 µm or less, in some examples 10 µm or less, in some examples 1 µm or less, in some examples 1000 nm or less, in some examples 900 nm or less, in 800 nm or less, in some examples 700 nm or less, in some examples 600 nm or less, in some examples 500 nm or less, in some examples 400 nm or less.

"At least some" in the contexts herein may indicate at least 50 wt % of the silver particles, in some examples at least 70 wt % of the silver particles, in some examples, at least 80 wt % of the silver particles, in some examples at least 90 wt % of the silver particles, in some examples at least 95 wt % of the silver particles, in some examples at least 98 wt % of the silver particles, in some examples at least 99 wt % of the silver particles.

In some examples, the silver pigment may comprise particles, e.g., nanoparticles having core-shell structures, wherein, in some examples, the core comprises a first metal, and the shell comprises a second metal, different from the first metal, and at least one of the first and second metals is silver.

In an example of any aspect, the silver pigment constitutes at least 40 wt/wt % of the solids of the electrostatic ink composition, in some examples at least 50 wt/wt % of the solids of the electrostatic ink composition, in some examples at least 60 wt/wt % of the solids of the electrostatic ink composition, in some examples at least 70 wt/wt % of the solids of the electrostatic ink composition, in some examples at least 80 wt/wt % of the solids of the electrostatic ink composition, in some examples at least 85 wt/wt % of the solids of the electrostatic ink composition, in some examples at least 90 wt/wt % of the solids of the electrostatic ink composition, in some examples at least 95 wt/wt % or 96 wt/wt % of the solids of the electrostatic ink composition.

In an example of any aspect, the silver pigment constitutes at least 25 vol/vol % of the solids of the electrostatic ink composition, in some examples at least 30 vol/vol % of the solids of the electrostatic ink composition, in some examples at least 40 vol/vol of the solids of the electrostatic ink composition, in some examples at least 50 vol/vol % of the solids of the electrostatic ink composition, in some examples at least 60 vol/vol % of the solids of the electrostatic ink composition, in some examples at least 65 vol/vol % of the solids of the electrostatic ink composition, in some examples at least 70 vol/vol % of the solids of the electrostatic ink composition.

It has been found that the higher the amount of the silver pigment in the solids of the ink (which can be measured either by weight or by volume), the higher the conductivity of the resultant printed trace, and the less aggressive post-treatment conditions can be used to achieved a desired conductivity. In some instances, to achieve a desired high conductivity, the method may not involve post-treatment, e.g. when the amount of silver pigment is at least about 65 vol/vol % or at least about 95 wt % of the solids in the electrostatic ink composition.

Liquid Carrier

The electrostatic ink composition comprises a liquid carrier. Generally, the liquid carrier can act as a dispersing medium for the other components in the electrostatic ink composition. For example, the liquid carrier can comprise or be a hydrocarbon, silicone oil, vegetable oil, etc. The liquid carrier can include, but is not limited to, an insulating, non-polar, non-aqueous liquid that can be used as a medium for toner particles, i.e. the particles containing the resin and the silver pigment. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-2™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The ink, when printed on the print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Resin

The electrostatic ink composition comprises a resin, which may be a thermoplastic resin. A thermoplastic polymer is sometimes referred to as a thermoplastic resin. The resin may coat the silver pigment, such that the particles comprise a core of silver pigment, and have an outer layer of resin thereon. The outer layer of resin may coat the pigment partially or completely. In some examples, the polymer of the resin may be selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in electrostatic ink or ink composition comprises a single type of polymer, the polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the electrostatic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the electrostatic ink composition and/or the ink printed on the print substrate. The polymer having ester side groups may constitute from 5% to 50% by weight of the total amount of the resin polymers, e.g. thermoplastic resin polymers, in the electrostatic ink composition and/or the ink printed on the print substrate, in some examples 10% to 40% by weight of the total amount of the resin polymers, e.g. thermoplastic resin polymers, in the electrostatic ink composition and/or the ink printed on the print substrate, in some examples 5% to 30% by weight of the total amount of the resin polymers, e.g. thermoplastic resin polymers, in the electrostatic ink composition and/or the ink printed on the print substrate, in some examples 5% to 15% by weight of the total amount of the resin polymers, e.g. thermoplastic resin polymers, in the electrostatic ink composition and/or the ink printed on the print substrate in some examples 15% to 30% by weight of the total amount of the resin polymers, e.g. thermoplastic resin polymers, in the electrostatic ink composition and/or the ink printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

In some examples, the silver pigment constitutes a certain wt %, e.g. at least 30 wt %, of the solids of the electrostatic ink composition, and the remaining wt % of the solids of the electrostatic ink composition is formed by the resin and, in some examples, any other additives that are present. The other additives may constitute 10 wt % or less of the solids of the electrostatic ink composition, in some examples 5 wt % or less of the solids of the electrostatic ink composition, in some examples 3 wt % or less of the solids of the electrostatic ink composition. The resin can, in some examples constitute about 1 to 70%, in some examples about 1 to 60%, by weight of the solids of the electrostatic ink composition and/or the ink printed on the print substrate. The resin can constitute about 1 to 50%, in some examples 1 to 40%, in some examples 1 to 30%, in some examples 1 to 20%, in some examples 1 to 10%, in some examples 1 to 5%, in some examples 1 to 4%, by weight of the solids of the electrostatic ink composition, and/or the ink printed on the print substrate. In some examples, the resin constitutes less than 1 wt % by weight of the solids printed on the electrostatic ink composition, e.g. after heating, and/or rubbing, and/or plasma treatment.

Charge Director and Charge Adjuvants

The electrostatic ink composition may include a charge director. The method as described here may involve adding a charge director at any stage. The charge director may be added to impart a charge of positive or negative polarity on particles containing the resin and the silver pigment. In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles comprising the resin and silver pigment. In some examples, the charge director imparts a positive charge on the particles comprising the resin and silver pigment.

In some examples, the charge director comprises a sulfosuccinate moiety of the general formula [$R_1$—O—C(O) $CH_2CH(SO_3^-)$C(O)—O—$R_2$], where each of $R_1$ and $R_2$ is an alkyl group. In some examples, the charge director comprises nanoparticles of a simple salt and a sulfosuccinate salt of the general formula $MA_n$, wherein M is a metal, n is the valence of M, and A is an ion of the general formula [$R_{1'}$—O—C(O)$CH_2CH(SO_3^-)$C(O)—O—$R_{2'}$], where each of $R_{1'}$ and $R_{2'}$ is an alkyl group, or other charge directors as found in WO2007130069, which is incorporation herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{+3}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, Bf, $F^-$, $ClO_4^-$, and $TiO_3^{4-}$, or from any sub-group thereof. The simple salt may be selected from $CaCO_3$, $Ba_2TiO_3$, $Al_2(SO_4)_3$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula [$R_{1'}$—O—C(O)$CH_2CH(SO_3^-)$C(O)—O—$R_{2'}$], in some examples, each of $R_{1'}$, and $R_{2'}$, is an aliphatic alkyl group. In some examples, each of $R_{1'}$, and $R_{2'}$, independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_{1'}$, and $R_{2'}$, are the same. In some examples, at least one of $R_{1'}$, and $R_{2'}$, is $C_{13}H_{27}$. In some examples, M is Na, K, Cs, Ca, or Ba. The formula [$R_{1'}$—O—C(O)$CH_2CH(SO_3^-)$C(O)—O—$R_{2'}$] and/or the formula $MA_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01 to 20% by weight, in some examples 0.01 to 10% by weight, in some examples 0.01 to 1% by weight of the solids of the electrostatic ink composition. In some examples, the charge director constitutes about 0.001 to 0.15% by weight of the solids of the electrostatic ink composition, in some examples 0.001 to 0.15%, in some examples 0.001 to 0.02% by weight of the solids of the electrostatic ink composition.

The electrostatic ink composition may include a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or comprises aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition.

In some examples, the particles comprising the resin and the silver pigment further comprise a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 abd Group 4 in the Periodic Table. In some examples, the multivalent cation comprises a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

In some examples, the particles comprising the resin and the silver pigment further comprise a salt of multivalent cation and a fatty acid anion and the composition further comprises a charge director selected from metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, and organic acid esters of polyvalent alcohols. In some examples, the particles comprising the resin and the silver pigment further comprise a salt of multivalent cation and a fatty acid anion and the composition further comprises a charge director selected oil-soluble petroleum sulfonates (e.g. neutral Calcium Petronate™, neutral Barium Petronate™, and basic Barium Petronate™), polybutylene succinimides (e.g. OLOA™1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. In some examples, the particles comprising the resin and the silver pigment further comprise a salt of multivalent cation and a fatty acid anion and the composition further comprises a charge director selected from a sulfosuccinate moiety of the general formula [$R_{1'}$—O—C(O)CH$_2$CH(SO$_3^-$)C(O)—O—$R_{2'}$], where each of $R_{1'}$, and $R_{2'}$, is an alkyl group, which may be as described above.

The charge adjuvant, which may, for example, be or comprise a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition.

Other Additives

The electrostatic ink composition may comprise an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Printing Process and Print Substrate

Also disclosed herein is a method of electrostatic printing on a print substrate, the method comprising:
providing an electrostatic ink composition as described herein;
forming a latent electrostatic image on a surface;
contacting the surface with the electrostatic ink composition, such that at least some of the particles adhere to the surface to form a developed toner image on the surface and transferring the toner image to the print substrate. In some examples, the silver pigment is substantially spherical and/or constitutes 30 wt % or more of the solids of the electrostatic ink composition.

The surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition of the invention between an electrode, which may be stationary, and a rotating member, which may be a member having the surface having the (latent) electrostatic image thereon or a member in contact with the surface having the (latent) electrostatic image thereon. A voltage is applied between the electrode and the rotating member, such that particles adhere to the surface of the rotating member. The intermediate transfer member, if present, may be a rotating flexible member, which may be heated, e.g. to a temperature of from 80 to 160° C.

The print substrate may be any suitable substrate. The substrate may be any suitable substrate capable of having an image printed thereon. The substrate may comprise a material selected from an organic or inorganic material. The material may comprise a natural polymeric material, e.g.

cellulose. The material may comprise a synthetic polymeric material, e.g. a polymer formed from alkylene monomers, including, but not limited to, polyethylene and polypropylene, and co-polymers such as styrene-polybutadiene. In some examples, the substrate, before printing, is or comprises plastic. In some examples, the substrate, before printing, is or comprises paper. The polypropylene may, in some examples, be biaxially orientated polypropylene. The material may comprise a metal, which may be in sheet form. The metal may be selected from or made from, for instance, aluminium (Al), silver (Ag), tin (Sn), copper (Cu), mixtures thereof. In an example, the substrate comprises a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print.

In some examples, the method further comprises, after transferring the toner image to the print substrate, heating the print substrate and/or rubbing an object over the toner image on the print substrate, to decrease the electrical resistance of the toner image. Rubbing an object over the toner image may indicate contacting an object with the toner image and effecting relative lateral movement on the print substrate and the object, such that the object moves across the print image. The rubbing may involve pressing together the print substrate and the object. Rubbing may be carried out manually or in an automated manner. Rubbing may involve moving an object in contact with the ink on the paper at a different velocity relative to the paper. The object in contact with the ink and used for the rubbing may comprise a material selected from plastic, rubber, glass, metal, and paper, which may be soft or strong paper. In some examples, the rubbing element can be heated, which has been found to improve efficiency.

In an example of the method, the heating involves heating the print substrate to a temperature of at least 80° C., in some examples at least 90° C., in some examples at least 100° C., in some examples at least 120° C., in some examples at least 130° C., in some examples at least 150° C., in some examples at least 180° C., in some examples at least 220° C., in some examples at least 250° C., in some examples at least 280° C. The heating may be carried out for a predetermined period. In some examples, the heating may be carried out until a sheet resistance of the ink printed on the substrate is 50 Ω/sq or less, in some examples 40 Ω/sq or less, in some examples 30 Ω/sq or less, in some examples 20 Ω/sq or less, in some examples 15 Ω/sq or less, in some examples 10 Ω/sq or less.

In an example of the method, the heating involves heating the print substrate to a temperature of from 100° C. to 250° C., for at a predetermined period of least 5 minutes, in some examples at least 10 minutes, in some examples at least 15 minutes, in some examples at least 20 minutes, in some examples at least 25 minutes, in some examples at least 30 minutes. The predetermined period may be from 5 to 60 minutes, in some examples from 15 to 45 minutes.

In an example of the method, the heating involves heating the print substrate to a temperature of from 100° C. to 250° C., in some examples of from 130 to 220° C., in some examples of from 140° C. to 200° C., in some examples from 140° C. to 160° C., for at least 15 minutes, and, in some examples and at most 1 hour.

In an example of the method, the heating involves heating the print substrate to a maximum temperature of at least 250° C., in some examples for at least 10 seconds. In an example of the method, the heating involves heating the print substrate to a maximum temperature of at least 250° C., in some examples from 250° C. to 350° C., in some examples for at least 10 seconds in some examples at least 20 seconds, in some examples at least 30 second, and, in some examples and at most 5 minutes, in some examples at most 3 minutes, in some examples at most 2 minutes, in some examples 90 seconds.

In an example of the method, the method further comprises, after transferring the toner image to the print substrate, subjecting the print substrate to a plasma treatment. The substrate may be subjected to a plasma treatment for a period of at least 1 minute, in some examples at least 5 minutes, in some examples at least 10 minutes, in some examples a period of from 5 minutes to 60 minutes, in some examples 5 minutes to 30 minutes, in some examples 10 minutes to 20 minutes, in some examples 12 to 18 minutes, in some examples about 15 minutes.

In an example of the method, before contacting the surface with the electrostatic ink composition, the composition is passed between an electrode and a developer roller, the electrostatic composition then being passed on the developer roller, until it contacts the surface having the latent electrostatic image thereon.

In an example of the method, before contacting the surface with the electrostatic ink composition, the composition is passed between an electrode and a developer roller, and there is a potential difference V1 between the electrode and the developer roller, the electrostatic composition then being passed on the developer roller, until it contacts the surface having the latent electrostatic image thereon. The polarity of the potential difference may be such that the particles are disposed to moved toward the developer roller and away from the electrode. The potential difference V1 may be from 200 to 600 V, in some examples 300 to 500 V, in some examples 350 to 450 V, in some examples about 400 V. It has been found that having relatively high potential difference assists in producing a desirable relatively thick layer of ink on the developer roller.

In some examples, the developer roller is at a potential, relative to ground, of at least 500 V, in some examples at least 600 V, in some examples at least 700 V, in some examples from 500 V to 1000 V, in some examples from 600 V to 1000 V, in some examples from 700 V to 900 V, in some examples from 750 V to 950 V.

In some examples, the developer roller is at a potential, relative to ground of −500 V or less, in some examples −600 V or less, in some examples −700 V or less, in some examples from −500 V to −1000 V, in some examples from −600 V to −1000 V, in some examples from −700 V to −900 V, in some examples from −750 V to −950 V.

In some examples, the surface having the latent electrostatic image thereon, has a potential difference V3 between the developer roller and the area on the surface within the image (which may be termed the image area) and a potential difference V4 between the developer roller and the area on the surface outside of the image (which may be termed the non-image area). V3 may be such that the particles comprising the resin and the silver pigment adhere to the surface in the image area, and V4 may be such that particles are disposed to move away from the surface and toward the developer roller. In some examples, the potential difference V3 may be a value of at least 500 V, in some examples at least 600 V, in some examples at least 700 V, in some examples a value of from 500 to 1000 V, in some examples a value of from 600 to 900V, in some examples a value of from 650 to 850 V, in some examples a value of from 700 to 800 V. In some examples, the potential difference V4 may be a value of 200 V or less, in some examples 150 V or less, in some examples 100 V or less, in some examples a value of from 80 V or less, in some examples a value of 60 V or less. It has been found that the transfer of the image seems to more effective when the potential difference between the developer roller and the image area is high relative to the potential difference between the developer roller and the non-image areas.

EXAMPLES

The following illustrates examples of the electrostatic ink composition and other aspects described herein. Thus, these Examples should not be considered as limitations of the present disclosure, but are merely in place to teach how to make examples of the present disclosure.

Pigment Loading

Pigment loading is important especially for Ag pigment, since it is a high-cost material. Percolation threshold should be determined very carefully. 80% PL by weight is equivalent to 28% by volume due to high density of the Ag particle. Ink preparation A-C® 575 (Honeywell®), mixed with Isopar in a Ross double planetary mixer that gave resin paste at 40% solids and Ag pigment (Ferro, R&DS7000-35 Ultra-Fine Ag Powder—300 nm size) at a particle loading (PL) of 80% (pigment weight from total solids weight) with 20% solids dispersion in Isopar-L of total of 200 gr were ground in a ball mill (SO—Union process) for 3 hours at 35° C. Ink was then taken out and diluted with Isopar L to give 5% solids dispersion. The dispersion was charged by NCD to give 60 picoSiemens LF (low field) conductivity. This electrostatic ink composition was then printed on LEP press HP-Indigo 7000. NCD indicates a commercially available charge director, HP Imaging Agent.

Charge director used to charge the above toner can be made of soya lecithin, basic barium petronate BBP, isopropyl amine dodecylebezene sulfonic acid, Oloa 1200 (Chevron), Oloa 11000 (Chevron) in isoparaffin (Isopar®-L from Exxon).

Printing Samples samples were printed on paper at different thicknesses (1-4 hits) and were sent to post treatment to give high conductive printed traces. The inks were printed on a HP-Indigo 7000 press. More information on the various post treatments are given below.

Post Treatment

Heat and Rubbing

Printed sample were heated up in oven at 150° C. for 30 min. Then, the sample was vigorously rubbed to give very high conductivity of the printed traces with resistivity of less than 10 Ω/sq. Alternatively, heat can be applied also by hot air gun at 300° C. for short time of a minute followed by rubbing. In FIGS. 1(a) and (b), it is possible to see the disappearing of the resin on top of the sample after the treatment and some compression of the silver particles results from the rubbing process.

FIGS. 1(a) and (b) show, respectively, an electronmicrograph photo of printed samples (a) before the 150° C. heat and rubbing post treatment and (b) after this post treatment.

Plasma Treatment samples were put in a plasma treatment apparatus (Diener, PICO UHP) using air under argon for 15 minutes to give a high conductive trace with resistivity of 10 Ω/sq. In the SEM photo below (FIG. 2) it is possible to again see the disappearing of the resin after it was etched by the plasma. This treatment results in packed Ag particles giving high conductivity.

Figure 2:
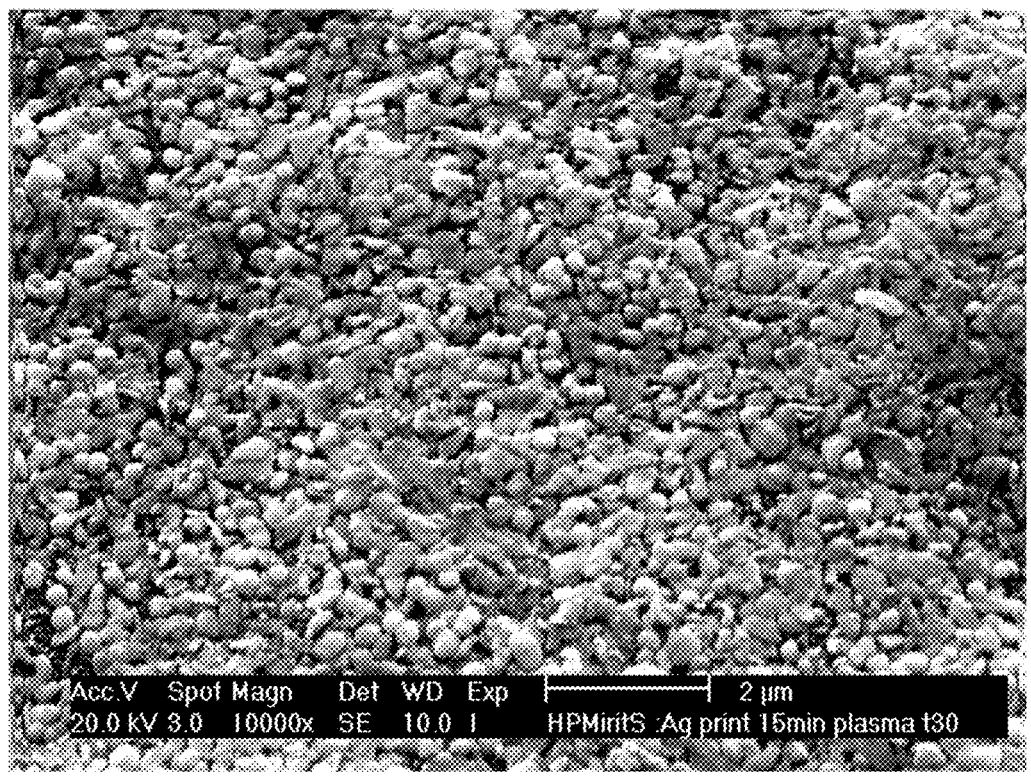
FIG. 2 shows SEM photo of an example of the ink described herein when printed on a substrate, and after it has been subjected to a plasma treatment.

FIG. 2 shows SEM photo of printed sample after plasma treatment

High Particle Loadings

Samples from above are made with 80 wt % PL which entailed relatively aggressive post printing treatment such as heat, rubbing or plasma etch (photo treatment is also an option) to achieve a resistivity of 10 Ω/sq. When increasing PL to 91 wt % and 96 wt % the amount of post treatment is reduced, and in fact no post-treatment was employed at 96 wt % PL, and a resistivity of 10 Ω/sq was still achieved. In Table II below the post treatment method and resistivity results for electroplated samples are shown.

TABLE II

| PL (weight) | PL (calculated volume) | Post printing treatment | Resistivity (sheet resistance) (Ω/sq) |
|---|---|---|---|
| 80% | 28% | Heat + rubbing | 10 |
| 80% | 28% | Plasma etch | 10 |
| 91% | 50% | Rubbing | 10 |
| 96% | 70% | none | 10 |

Print Samples Appearance after Treatment

Print samples after treatment (plasma or heating+rubbing) both showed resistivity of about 10 Ω/sq, however there is a different in their appearance.

Figure 3:
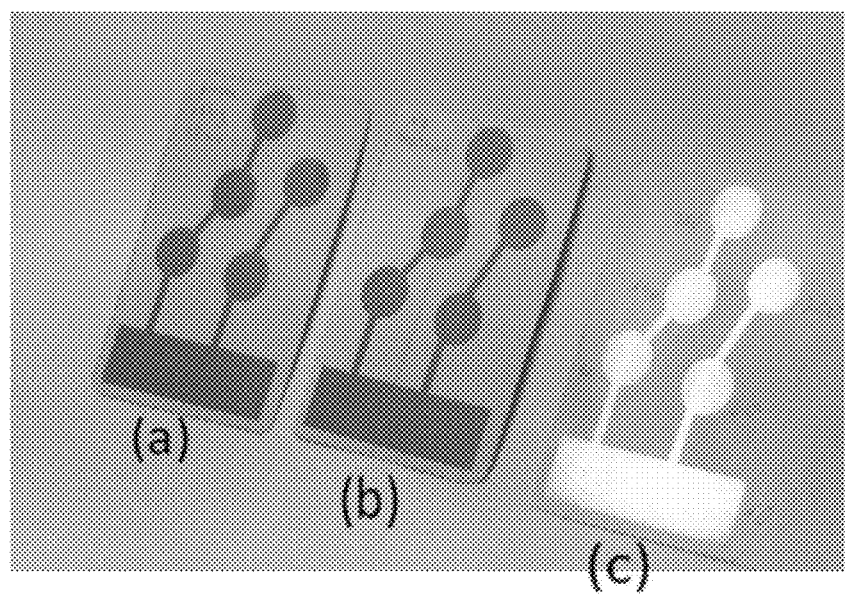
FIGS. 3(a), 3(b) and 3(c) show, respectively, pictures of examples of the ink printed on a print substrate (a) before treatment (b) after plasma treatment and (c) after heating and rubbing the print.

FIG. 3 shows print samples after different treatments. It can be seen from this Figures that after heating and rubbing the print became very metallic and glossy (high brilliance) compared to the print after plasma treatment.

FIGS. 3(a), 3(b) and (c) show, respectively, pictures of the silver prints (a) before plasma treatment (b) after plasma treatment and (c) after heating and rubbing the print.

While the compositions and related aspects have been described with reference to certain examples, those skilled in the art will appreciate that various modifications, changes, omissions, and substitutions can be made without departing from the spirit of the disclosure. It is intended, therefore, that the compositions and related aspects be limited by the scope of the following claims. The features of any dependent claim may be combined with the features of any of the other dependent claims or any and/or any of the independent claims.

The invention claimed is:

1. An electrostatic ink composition comprising:
a liquid carrier,
a charge director, and
particles dispersed in the liquid carrier, wherein the particles comprise a resin
and a substantially spherical silver pigment; wherein the substantially spherical silver pigment constitutes at least 30 wt % of the solids of the electrostatic ink composition.

2. An electrostatic ink composition according to claim 1, wherein the substantially spherical silver pigment comprises silver particles, at least some of which have a diameter of at least 80 nm.

3. An electrostatic ink composition according to claim 2, the silver pigment comprises silver particles, at least some of which have a diameter of at least 150 nm.

4. An electrostatic ink composition according to claim 1, wherein the silver pigment constitutes at least 50 wt % of the solids of the electrostatic ink composition.

5. An electrostatic ink composition according to claim 1, wherein silver pigment constitutes at least 80 wt % of the solids of the electrostatic ink composition.

6. An electrostatic ink composition according to claim 1, wherein the silver pigment constitutes at least 90 wt % of the solids of the electrostatic ink composition.

7. An electrostatic ink composition according to claim 1, wherein the silver pigment constitutes at least 95 wt % of the solids of the electrostatic ink composition.

8. An electrostatic ink composition according to claim 1, wherein the resin comprises a polymer having acidic side groups.

9. An electrostatic ink composition according to claim 1, wherein the resin comprises a polymer selected from a co-polymer of (i) ethylene or propylene and (ii) an ethylenically unsaturated acid of either acrylic acid or methacrylic acid; and ionomers thereof.

10. An electrostatic ink composition according to claim 1, wherein the liquid carrier constitutes at least 70 wt % of the electrostatic ink composition.

11. An electrostatic ink composition according to claim 1, wherein the liquid carrier constitutes at least 90 wt % of the electrostatic ink composition.

12. A print substrate having printed thereon an electrostatic ink to form an electrostatic latent image, comprising a charge director, a resin having acidic side groups, and a substantially spherical silver pigment; wherein the substantially spherical silver pigment constitutes 30 wt % or more of the solids of the electrostatic ink.

13. A print substrate according to claim 12, wherein substantially spherical silver pigment constitutes at least 90 wt % of the solids of the electrostatic ink.

14. A print substrate according to claim 12, wherein the resin comprises a polymer selected from a co-polymer of (i) ethylene or propylene and (ii) an ethylenically unsaturated acid of either acrylic acid or methacrylic acid; and ionomers thereof.

15. The electrostatic ink composition according to claim 1, wherein the charge director comprises soya lecithin, a barium sulfonate salt, and an isopropyl amine sulfonate salt.

16. The electrostatic ink composition according to claim 1, wherein the composition comprises a charge adjuvant.

17. The electrostatic ink composition of claim 16, wherein the charge adjuvant comprises aluminum distearate or aluminum tristearate.

* * * * *